July 27, 1965  D. S. NORTON  3,196,776
MULTIPLE SPIT WITH INDIVIDUAL SPIT ROTATORS
Filed Aug. 20, 1962  2 Sheets-Sheet 1
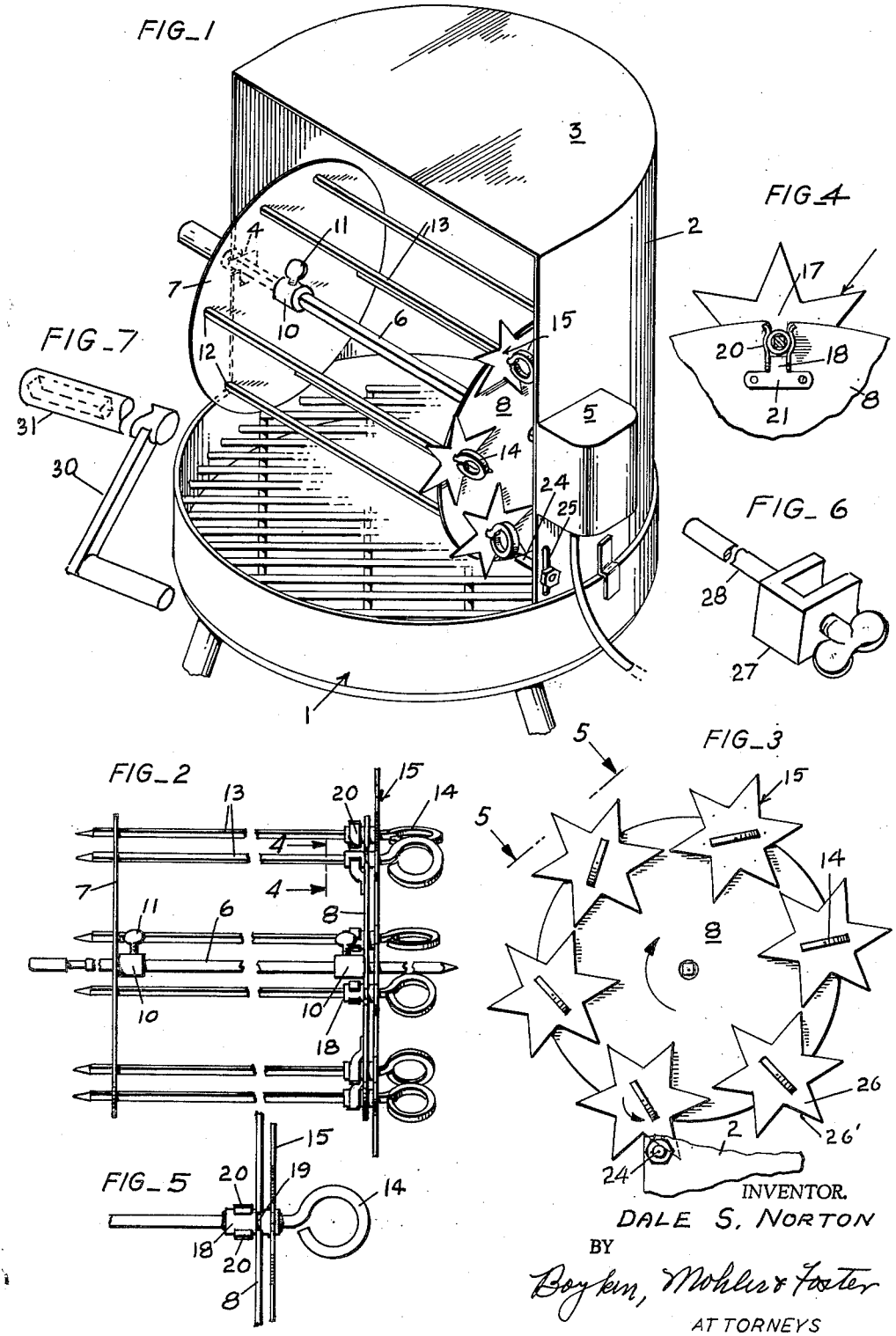
INVENTOR.
DALE S. NORTON
BY
Boykin, Mohler & Foster
ATTORNEYS July 27, 1965  D. S. NORTON  3,196,776
MULTIPLE SPIT WITH INDIVIDUAL SPIT ROTATORS
Filed Aug. 20, 1962  2 Sheets-Sheet 2
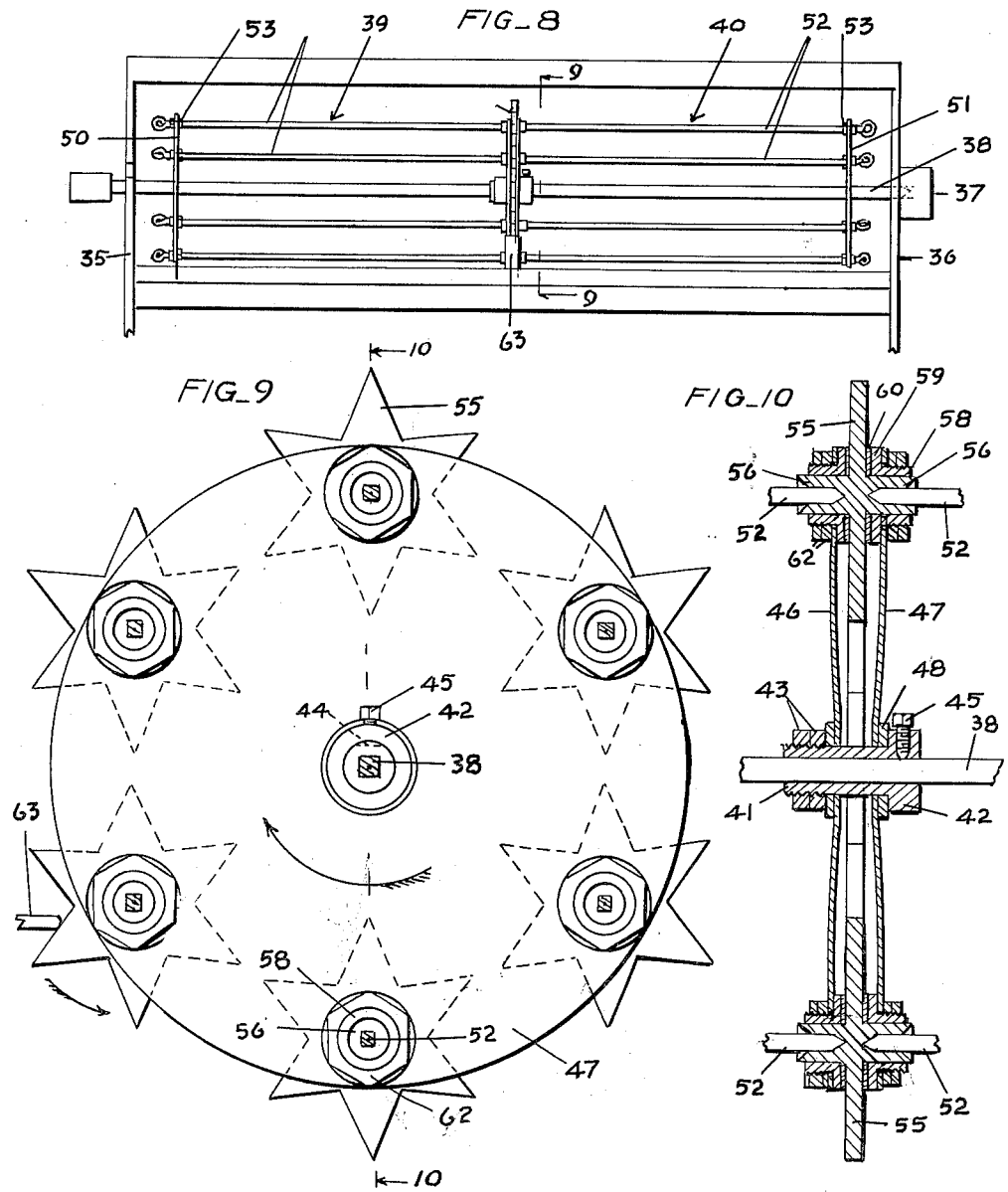
INVENTOR.
DALE S. NORTON
BY
Boyken, Mohler & Foster
ATTORNEYS 3,196,776
MULTIPLE SPIT WITH INDIVIDUAL SPIT
ROTATORS
Dale S. Norton, Danville, Calif., assignor of one-half to
   Henry Fitzpatrick, Danville, Calif.
Filed Aug. 20, 1962, Ser. No. 217,993
5 Claims. (Cl. 99—421)

This invention relates to a multiple spit, and has for one of its objects the provision of a plurality of spits adapted to be supported for movement on an endless path of travel past heating means for cooking the food impaled on the spits, and which spits are provided with means adapted to automatically rotate each spit a predetermined degree at a point in said path of travel upon such means engaging an element at said point.

Another object of the invention is the provision of a multiple spit assembly that is economical to make, easy to clean and that is adapted to withstand severe usage without injury.

An additional object is the provision of a multiple spit assembly that is adapted to be substituted for the conventional power driven or manually driven single spit in a conventional broiler of the type having a removable, rotatably mounted spit.

Another object of the invention is the provision of a rotatable spit carrier supporting a plurality of spits for revolution about a central axis, each of said spits being readily removable from and replaceable on said carrier and each of which spits is adapted to be automatically rotated about its axis at a point during said revolution of said carrier independently of the other spits and without the employment of gears, chains and the like.

An additional object is the provision of a multiple spit assembly in which there is provision for supporting an annular row of parallel spits in side by side relation for revolution of said spits in an annular path, and a simple means on each spit that is adapted to rotate each spit a predetermined degree upon said means engaging an element positioned adjacent to said path as each spit passes said element while being moved in said annular path.

While it has been possible, heretofore, in conventional broilers to broil food impaled on a single spit or skewer that is connected with a motor for rotation thereof, or that is manually rotated, no economical, simple and satisfactory means has been provided for broiling food on a plurality of spits or skewers. Most efforts that have been made for accomplishing this result automatically employ sprocket wheels and chains or various gear arrangements and the spits are continuously rotated during movement in an endless path of travel.

The usual practice is for a plurality of spits to be supported adjacent to their ends in a row extending over a charcoal bed, and the operator turns each spit manually at irregular intervals, and usually the degree each spit is rotated may vary, according to the position at which the spit will stay in a stationary position.

With the present invention, a plurality of spits, each holding a balanced or an unbalanced load of food to be broiled, will automatically be rotated a uniform distance before each passage of each spit past the heating or cooking means, thus ensuring a uniform cooking of the food. The conventional motive power on the usual patio type charcoal broilers is adapted to move the spits, and means is provided for varying the degree of rotation of each spit in each cycle in its movement in an endless path. Also the spits may be separately removed from the multiple spit assembly without removing the assembly from the broiler, or the entire assembly of spits may be removed as a unit for carrying the assembly to a table or other place where each spit may be separately removed.

In the drawings, FIG. 1 is an isometric view of a conventional broiler having the spit assembly supported thereon;

FIG. 2 is a side elevational view of the spit assembly separate from the broiler, and broken in length;

FIG. 3 is an end elevational view of the assembly shown in FIG. 2 as seen from the right hand end of FIG. 2;

FIG. 4 is an enlarged, fragmentary, sectional view taken along line 4—4 of FIG. 2;

FIG. 5 is a fragmentary elevational view of the right hand end of a single spit, as seen from line 5—5 of FIG. 3;

FIG. 6 is an enlarged perspective view of an element adapted to be clamped to the spit support or broiler in place of a spit turning element shown in FIG. 1;

FIG. 7 is an enlarged perspective view of a manually actuatable handle that may be used to turn the multiple spit assembly instead of the motor illustrated in FIG. 1;

FIG. 8 is a front elevational view of a broiler or spit support, of a commercial type, having a substantially greater capacity than the broiler of FIG. 1;

FIG. 9 is an enlarged cross sectional view taken along line 9—9 of FIG. 8;

FIG. 10 is an enlarged cross sectional view taken along line 10—10 of FIG. 9.

In FIG. 1 a conventional broiler is illustrated which broiler includes a base generally designated 1 that, in turn, may have legs for supporting it on the ground or on a floor. This base usually carries a bed for charcoal or a grate, and a hood which has vertical walls 2 supported on said base and which walls, in turn, support a top plate 3. The walls 2 extend only partially around the base leaving one side open for access to the spits, and for installing and removing the spit. Wall 2 at one side of the base is usually formed with a horizontal slot 4 that opens outwardly of one vertical free edge of the hood wall through which open end of said slot one end portion of the spit may be inserted for support of said end portion for rotation thereof on the upper edge of a downward enlargement of the recess at its inner end.

The other end portion of the spit is normally pointed to enable impaling food on the spit, but is of rectangular cross sectional contour to be received within a complementarily formed recess in a chuck driven by motor 5 carried on wall 3 at the side of the base opposite to the slot 4.

The bar 6 in the spit assembly of this invention substantially corresponds to a conventional spit. It is adapted to be installed in the conventional broiler and removed therefrom in exactly the same manner as a conventional spit whether motor driven or manually driven, and it may have the usual handle at the end that extends outwardly of slot 4. Where a motor is not used, the wall 2 on which the motor is attached is provided with an opening through which the pointed end of the spit freely extends, and it is supported for rotation on the edge that defines the lower edge of such opening. This opening is usual whether the motor is used or not, since it is in registration with the motor driven chuck.

Bar 6 provides the support for the spit carriers in the present invention, and insofar as this invention is concerned, it should be understood that its use is not dependent upon the particular broiler that is shown. The ends of the bar 6 may be supported for rotation on any suitable support. However, it is an important feature of this invention that it is adapted to be substitued for the single spit in a conventional broiler without modifying the latter.

Adjustably secured on the bar 6, are a pair of opposed plates or carrier discs 7, 8 that may be called the spit carrier for a plurality of spits. Each carrier disc 7, 8 may have a central hub 10 secured thereto through which the bar 6 is adapted to pass, and a set screw 11 threadedly extends through each hub for securing the carrier discs in adjusted positions along said rod. Thus spits of different lengths may be used, or the pair of carrier discs may be offset more toward one end than the other, if desired, as where relatively short spits are used over only a portion of the bed of coils carried by the base, leaving the rest of the bed free for other working operations. In any event, the set screws 11 will secure the spit carrier securely on rod 6.

The carrier discs 7, 8 are circular, although this is not essential. The disc 7 is the left hand disc in looking at the drawings, and it is formed with an annular row of openings 12 adjacent to its outer edge. Each of these openings 12 is adapted to receive one of the ends of corresponding spits 13, which ends are pointed in the usual manner for impaling meat and the like. The spits are preferably rectangular in cross sectional contour, which is the usual contour of spits, but the openings 12 are preferably circular for rotatably supporting the ends of the spits that extend through them.

The opposite end of each spit 13 may be provided with a handle 14 of any suitable structure. This handle may be in the form of a loop, as illustrated (FIG. 5), formed from an end portion of the spit itself, or it may be screwed, riveted or otherwise secured to the spit.

The spits 13 are all alike, hence a description of one will suffice for the others.

In the illustration, a plate-like element 15 in the form of a six pointed star, is centrally secured on each spit adjacent to handle 14. When each spit is separate from the assembly, it is adapted to be held by handle 14 and manipulated in the same manner as any other spit. The element 15, being in a plane at a right angle to the longitudinal axis of the spit, will function as a guard against the drainage of hot fat or juice therepast to the hand that grasps the handle. Such fat or juice will quickly drain off whichever point is lowermost.

The carrier disc 7 has been described, being merely a circular disc with openings 12 formed thereon for receiving the ends of the spits opposite to the handle 14.

The carrier disc 8 is formed along its circular outer marginal portion with radially outwardly opening recesses 17 (FIG. 4) that are in register, or aligned, with the openings 12 in the carrier disc 7, and each spit is provided with a cylindrical bearing 18 (FIGS. 4, 5) coaxial with the longitudinal axis of the spit adjacent to each element 15 at the side of the latter opposite to the handle. This bearing 18 may be formed with an annular, radially outwardly opening groove 19 coaxial therewith, within which the opposite edge of each recess 17 is adapted to be received upon movement of the handle end portion of the spit radially inwardly of carrier disc 8.

The major portion of bearing 18 is at the side of groove 19 that extends toward the carrier disc 7, and this portion is frictionally, rotatably, and releasably held between a pair of spring arms 20 (FIG. 5), which arms, in turn, are integral with a base portion 21 that is secured rigidly to the carrier disc 8 in a position extending across the closed inner end of recess 17. The spring arms 20 are preferably flat sided, and formed with opposedly directed concave cylindrical surfaces adapted to substantially conform to the cylindrical surface of the bearing 18. The arms 20 are alongside the opposite edges or sides of recess 17 and the radially outwardly positioned ends of said arms are flared apart to facilitate the entry of the bearing 18 between said arms, said bearing springing the arms apart as it is forced radially upwardly relative to the axis of the carrier disc 8 to a position frictionally gripped between the opposed concave surfaces of the arms 20.

In assembly the spits on the carrier discs 7, 8, the outer end of each disc 8 is inserted into each opening 12 and then the handle end of each spit is swung so that the edges of each recess 17 will enter the annular groove 19 in each spit, and at the same time the bearing 18 will spring arms 20 apart to a position frictionally gripped between the concave opposed surfaces of arms 20. The spit is removed by merely pulling the bearing 18 radially outwardly from between arms 20 by pulling on handle 14.

Obviously in the above operation the spit may have the food to be cooked impaled thereon, and it is to be understood that the spit may have the conventional pair of tines therein intermediate its ends and extending parallel with the spit, in the event the spit is used for broiling fowls. Such tines, in some conventional spits, are adapted to be releasably attached to the spit, being carried by a collar through which the spit is slidable and which collar has a set screw similar to set screw 11 that is used for the carrier discs. It is not believed necessary to show the fowl impaling tines, since they are in common use and the word "spit" is intended to include their use.

The sides of the groove 19 function to prevent any movement of the spit longitudinally thereof relative to the carrier disc 8. This is important for the reason that the proper, uniform operation of the spits requires the elements 15 to be substantially in the same plane, and in a plane that should be positioned with reasonable accuracy relative to a spit turning element.

The spit turning element illustrated in FIG. 1 is a horizontal pin 24 having a reduced diameter end adapted to extend through a vertical slot 25 formed in a marginal portion of the wall 3 adjacent to the lower end of the free vertical edge of said wall that, in turn, is adjacent to motor 5.

The diameter of the carrier disc 8, and the size of each star-like element 15, and the position of each spit 13 when the latter are on the spit carrier and when the spit carrier is on the support, are such that the spit turning element (bar 24) will engage one of the radially outwardly projecting arms 26 of each star, upon rotation of the carrier. Thus it will be seen that, upon rotation of the spit carrier by operation of motor 5, each spit will be partially rotated as an arm of each star member 15 engages the element 24 and moves past the latter. When the spits are initially assembled on the spit carriers, the spit rotating members 15 will not necessarily be in any particular relation to member 24, but after one complete revolution of the carrier, each element 15 will thereafter be rotated through the same number of degrees, and the member 24 is adjustable to insure the proper and desired rotation. The star-shape provides a slanted bar engaging edge 26' on each arm 26 of each star member 15 that is inclined so as to smoothly engage said bar or element 24 free from shock, since the edge 26' is slanted rearwardly relative from the point of engagement between bar 24 and the outer end of the arm relative to the forward direction of travel of the star element 15.

Different numbers of arms may be used, and, as already pointed out, the arms 26 need not be star-like arms, although the latter are preferable due to the lack of shock upon engagement with bar 24 and the reduction in wear due to the slant of each edge 26' relative to the direction of movement of the elements 15.

Instead of the bar 24, a C-clamp 27 (FIG. 6) having a bar 28 thereon may be used, the clamp 27 being adapted to receive the edge of wall 2 at about the same position of bar 24, and which clamp is adjustable vertically to accomplish the same result as the structure of FIG. 1. Clamp 27 is attachable to any support having a portion to which it may be clamped so as to position the bar 28 in the path of travel of one of the arms 26 on each member 15.

It is, of course, obvious that the motor may be eliminated, and a conventional manual crank 30 (FIG. 7) substituted therefor, which crank has a chuck portion 31 to receive the end of the spit bar 6 in place of the motor chuck.

Referring to FIG. 3, the direction of rotation of each spit upon the spit rotating member 15 engaging bar 24 is counterclockwise, as viewed in FIG. 2, and the spit carrier revolves clockwise. Normally the hood walls 2 would be, as seen in FIG 1, at the right hand side of the carrier assembly, and the bed of coals or heating means would be in base 1. As each spit in the lowermost portion of its path of travel moves over the base 2 or bed of coals therein, the lower portion of the meat on the spit will be subjected to intense heat. The juices drawn to the heated side will be carried upwardly with the heated side and will tend to flow downwardly over the surface of the meat that is still to some degree facing the heat and that is more receptive to absorption of the juice than the cooler side that faces outwardly of the open side of the broiler.

The spits may be replaced while the spit carrier is turning if the movement is relatively slow, or the entire carrier can be lifted from the broiler and replaced by another loaded unit as readily as the exchange of a single spit could be accomplished. It is not material how the spits are replaced insofar as the arrangement of the arms of the turning element 15 are concerned, since its position will be automatically corrected after one revolution of the carrier.

FIGS. 8 to 10 illustrate a multiple spit having a substantially greater capacity than the spit of FIG. 1, and which spit is adapted to be used on a support or broiler having spaced, horizontally opposed, vertically extending walls 35, 36, in which wall 35 corresponds generally to the wall in FIG. 1 having slot 4 formed therein, while wall 36 carries the motor 37 that may correspond to motor 5. Obviously the broiler or support may have any desired horizontal cross sectional contour, provided it has supports for the spit.

Central rod 38 substantially corresponds to rod 6, and on this rod 38, as seen in FIG. 1, are a pair of spit assemblies generally designated 39 and 40. Rod 38 is inserted and removed from the broiler in the same manner as the rod 6 with its spit assembly.

Approximately centrally between the end portions of rod 38 is a sleeve 41 (FIG. 10) through which the rod passes, and this sleeve has a radially outwardly projecting flange 42 on one end thereof, and nuts 43 are threadedly supported on the other end, one being a lock nut. A set screw 45 threadedly extends through flange 42 radially thereof and into engagement with the rod 38 for securing the sleeve rigid with said rod in an adjusted position along the latter.

A pair of centrally apertured, resilient discs 46, 47 are on sleeve 41, the sleeve extending through the apertures in said discs. This sleeve 41 may have an external rectangular cross sectional contour, or a flat side 44 (FIG. 9), and the central apertures in discs 46, 47 are complementarily formed so that the discs will rotate with rod 38 and will not rotate relative to said sleeve. However, the discs may be movable toward and away from each other at the sleeve. Movement toward each other is effected by rotation of the nuts 43 toward flange 42, and preferably circular washers 48 of equal size and shape are respectively positioned between nut 43 and disc 46 and between flange 42 and disc 47, the said washers being coaxial with the sleeve.

Spaced from the disc 46, and on rod 38 at the end of the latter that is remote from the wall 36 is a circular disc 50 that may correspond to the disc 8 of FIG. 1 while a similar disc 51 is on the end portion of rod 38 that is adjacent to the wall 36. Each of these discs may be radially outwardly slotted around their outer peripheries to receive one end of each of spits 52. Each spit 52 substantially corresponds to each of the spits 13 of FIG. 1 except that they do not have the spit rotating star shaped element 15 of FIG. 1, and each of the discs 50, 51 have the spring fingers 53 corresponding to fingers 20 of FIGS. 2 and 5 and bearings on the spits are received between said fingers, in the same manner as in FIG. 2. However, the fingers 52 in this instance are relied upon to releasably hold the ends of the spits that are opposite to their pointed ends, to each of the discs 50, 51.

The ends of the spits 52 that are opposite to and between discs 50, 51 are carried by the discs 46, 47 around the outer marginal portions of said discs 50, 51, so that spits 52 will be in two annular rows, one for each spit assembly 39, 40 with the spits in each assembly equally spaced from each other in parallel relationship in an annular row around and coaxial with rod 38.

A star wheel 55 supports the pointed ends of spits 52, the latter being rectangular in cross sectional area, the same as spits 13. There is a single star wheel for each pair of longitudinally aligned spits 52 in the assemblies 39, 40. Each star wheel has oppositely outwardly projecting coaxially aligned hubs 56 (FIG. 10) that are formed with coaxial outwardly opening recesses to removably receive the pointed ends of each pair of aligned spits 52, and the cross sectional contours of the recesses are complementary to the rectangular cross sectional contours of the spits, hence the spits will rotate with the star wheels.

Rotatably supported on each hub 56 is a cylindrical bearing 58 and each bearing is formed with an annular outwardly projecting flange 59 at one end thereof. These bearings are positioned on the hubs 56 so that the flanges 59 are adjacent to opposite sides of each star wheel 55, and between each of the flanges 59 and the side of the star wheel adjacent thereto is a wave washer or friction washer 60. The end portions of each bearing opposite to the flange 59 is externally threaded, and one or a pair of nuts 62 are threaded thereon.

The marginal portions of the discs 46, 47 are apertured to receive the hubs 56 of the bearings 58 and the marginal portions of the discs around said aperture are between the nuts 62 and the flanges 59.

Upon tightening the nuts 43 on the central rod 38 the marginal portions of the discs will tighten against the flanges 59 with the result that the friction washers will be tightened against opposite sides of the respective star wheels. Thus the frictional resistance to rotation of the star wheels may be regulated. The tighter the nuts 43 are screwed to force the central portions of the discs 46, 47 toward each other, the greater will be the resistance to rotation of the star wheels and, if desired, friction washers may be placed at opposite sides of each flange 59.

By the above structure, the spits 52 will be frictionally held in any desired position relative to the discs 46, 47, hence any unbalance of meat or food on the spits will not cause them to rotate.

A split actuating element 63 (FIGS. 8, 9) may be adjustably secured to the forward side of the broiler to engage one of the arms of each star wheel as the spit assembly, as a whole, is rotated by the motor 37 (FIG. 9). The position of the element 63 determines the point where each star wheel will be rotated. As seen in FIG. 9, the food on the spits will have passed the bed of coals under the spit assemblies, and will be on their way up when they will be rotated, and the direction of rotation of the spits will be such as to cause the juice from meat to be drained over the surface that has just passed the hottest portion of the bed of coals. Thus this surface will be basted, the same as occurrred with respect to the broiler of FIG. 1.

The fact that there is no substantial amount of frictional resistance to removal of the spits makes it easy to remove and replace the spits as the spit assembly is being rotated and, while this structure is applied to the form of the invention as disclosed in FIGS. 8-10, it may be employed in the smaller assembly, if desired, by eliminating the assembly 40 and shortening the rod 38.

It is to be understood that modifications may be made in the invention without departing from the spirit thereof or the scope of the appended claims.

I claim:
1. A multiple spit comprising:
(a) a pair of horizontally spaced, opposed spit carriers connected for simultaneous rotation in the same direction about a horizontal axis;
(b) spit supporting means on one carrier of said pair for releasably and rotatably supporting one of the ends of a plurality of elongated spits spaced from said axis and from each other around said axis for rotation of each of said one of said ends independently of the other spits;
(c) spit holding means on the other carrier of said pair for receiving and releasably holding the other ends of such spits when said one of the ends of said spits are supported by said spit supporting means and when said other ends of said spits are moved from positions spaced outwardly of said other carrier into said spit holding means, and
(d) a plurality of spits having one of their ends rotatably supported by said spit supporting means and having their other ends releasably and rotatably held by said spit holding means; and
(e) separate means respectively on each of said spits and at a stationary point adjacent to one of said spit carriers engagable with each other only once upon each complete revolution of each spit about said axis upon said rotation of said carriers for rotating each spit a predetermined degree upon each such engagement;
(f) said spit holding means including means in direct engagement with each spit for holding each of said spits stationary relative to said carriers during each such revolution of each spit between each said engagement at said stationary point;
(g) each of said spits being free from obstruction to manual removal thereof from said spit supporting means and said spit holding means independently of the other spits any time when said spits are manually accessible to a person.

2. A multiple spit carrier comprising:
(a) a central, horizontally elongated main spit having a pointed end for impaling food thereon, and adapted to be rotatably and removably supported at its ends on a broiler or the like for supporting such food in broiling relation to a source of heat in such broiler; and for removal of said spit from said broiler;
(b) a pair of horizontally spaced opposed spit carriers centrally supported on said central spit and supporting means supporting said carriers on said central spit for removal from said pointed end and for movement toward and away from each other on said central spit to different adjusted positions;
(c) means on each carrier for rigidly securing each carrier on said central spit in any of said adjusting positions;
(d) auxiliary spit supporting means on said carriers equally spaced from each other and from said central spit for removably supporting horizontal auxiliary spits thereon in an annular row in which said auxiliary spits are equally spaced from each other and from said central spit and a plurality of such auxiliary spits so supported in said annular row by said spit supporting means;
(e) said auxiliary spit supporting means including yieldable means on said carriers releasably and rotatably supporting said auxiliary spits thereon in said row;
(f) engageable spit positioning means respectively on at least one carrier of said pair and on each auxiliary spit releasably holding each auxiliary spit in a predetermined fixed position relative to said one carrier in any of said adjusted positions of said pair of carriers;
(g) auxiliary spit rotating means on each spit adapted to engage a fixed element adjacent to said row upon rotating said main spit and carriers for rotating each auxiliary spit a predetermined degree upon each such auxiliary spit passing such element,
(h) said auxiliary spit supporting means on one of the carriers of said pair being in direct, yieldable, frictional engagement with said spits at all times while said spits are supported thereby under a predetermined, minimum tension sufficient to preclude rotation of said spits relative to said spit supporting means under the influence of an eccentrically positioned load on said spits relative to the respective axes of the latter.

3. In a broiler that includes a pair of horizontally spaced supports adapted to rotatably support a multiple spit assembly thereon for broiling food to be carried by the spits of said assembly:
(a) a horizontally elongated bar removably and rotatably supported at its ends on said spaced supports;
(b) a pair of horizontally spaced, opposed, vertically disposed rotary members removably secured on said bar and coaxial therewith for rotation as a unit with said bar about the axis of the latter;
(c) a plurality of horizontally disposed spits;
(d) spit supporting means on said rotary members for rotatably supporting said spits at their ends on said members in an annular row that is coaxial with the longitudinal axis of said bar with said spits equally spaced from each other and from said bar, and parallel with the latter, said supporting means supporting each of said spits for removal therefrom and from said members independently of each other at any position of each spit in said annular row while said bar supports said rotary members for rotation on said supports;
(e) spit rotating means on one of the correspondingly positioned ends of said spits rigid with and projecting radially outwardly of each spit relative to its longitudinal axis rotatable as a unit with each spit and bodily movable in an annular path with said spits about the axis of said bar upon rotation of said bar and said members about said axis of said bar;
(f) a stationary spit turning element adjustably secured on one of said spaced supports in a position adjacent to said annular path in which said spit rotating members are adapted to move for engagement with each of the latter upon movement of each of said spit rotating members past said spit turning element for rotating each spit about its longitudinal axis in said row in succession upon said rotation of said members;
(g) means for adjustably supporting and securing said stationary spit turning element stationary in different positions relative to said annular path to vary the point of said engagement between said spit rotating means and said spit turning element;
(h) said spit supporting means on one of said members including means engaging each spit for holding each spit against rotation about its longitudinal axis under the influence of gravity on an unbalanced load thereon during the time each spit rotating means is out of engagement with said spit turning element, and;
(i) means for releasably securing said pair of members rigid on said bar, said pair of members being movable off one of the ends of said bar upon said bar being removed from said vertical supports and upon releasing said pair of members from said securement to said bar.

4. In a structure as defined in claim 3:
(j) said bar being a conventional spit pointed at one end to impale food thereon upon removal of said pair of members therefrom;
(k) said ends of said bar projecting oppositely outwardly of said pair of members for being directly supported on said spaced supports for rotation thereof;

(1) said means for releasably securing said pair of members on said bar being adapted to so secure said members on said bar at different distances from the ends of said bar whereby said spit rotating means on said spits may be secured in adjusted positions relative to said spit turning element.

5. In a multiple spit carrier that includes a pair of coaxial, horizontally spaced, opposed members supported for rotation about a horizontal axis and adapted to releasably carry an annular row of parallel, horizontally elongated spits extending therebetween for movement therewith about said axis, and for rotation of each spit about its longitudinal axis relative to said members only upon movement of each spit past a stationary spit rotating element at a position adjacent to said row, and a stationary spit rotating element at said point, the improvement that comprises:

(a) a plurality of such horizontally elongated spits each having a plurality of generally radially outwardly extending projections rigid therewith at one end thereof, each projection having an element-engaging surface adapted to engage said spit rotating element at said point when each spit is on said members and is carried thereby past said spit rotating element for thereby effecting said rotation of each spit;

(b) a handle on one end of each spit projecting therefrom and adapted to be grasped by the hand of a person for removing each spit from said members and for replacement of each spit thereon;

(c) spit supporting means on said members for releasably supporting said spits thereon in an annular row for said rotation of said spits independently of each other and for removal and replacement of each spit from said members independently of the other spits;

(d) spit positioning means between said projections and said spit supporting means positioning said spits on said spit supporting means for said rotation of each spit with the handle on each spit adjacent to said projections and projecting from one side of one member of said pair in a fully exposed position for said grasping by said hand for said removal and replacement of each spit independently of other spits on said members;

(e) said spit positioning means comprising portions respectively on and rigid with one of said members and on each spit in releasable engagement with each other holding each spit from axial movement thereof relative to said members when each spit is supported on said spit supporting means; and, (f) said spit supporting means for each spit including spring means in yieldable, releasable engagement with each spit frictionally holding each spit at all times when said spits are carried by said spit supporting means against rotation thereof under the influence of gravity on an unbalanced load thereon, each spit being releasable from each such spring means upon each spit being removed from the member carrying said spring means.

References Cited by the Examiner

UNITED STATES PATENTS

| | | | |
|---|---|---|---|
| 529,932 | 11/94 | Meier | 188—83 |
| 1,141,230 | 6/15 | Burke | 188—83 |
| 2,033,578 | 3/36 | Kittel | 188—83 |
| 2,142,390 | 1/39 | Zerr | 99—421 |
| 2,324,233 | 7/43 | Parsons | 99—421 |
| 2,833,205 | 5/58 | Purtzer | 99—421 |
| 2,854,918 | 10/58 | Merritt | 99—421 |
| 2,985,096 | 5/61 | Wolske | 99—421 |
| 3,104,605 | 9/63 | McKinney | 99—421 |

FOREIGN PATENTS

| | | |
|---|---|---|
| 1,093,890 | 11/54 | France. |
| 487,467 | 12/29 | Germany. |

ROBERT E. PULFREY, *Primary Examiner.*

NORTON ANSHER, JEROME SCHNALL, *Examiners.*